(12) United States Patent
Lamy

(10) Patent No.: US 11,688,255 B2
(45) Date of Patent: Jun. 27, 2023

(54) METHODS AND SYSTEMS APPLIED TO TRANSPOSING AUDIO SIGNALS TO HAPTIC STIMULI IN THE BODY FOR MULTICHANNEL IMMERSION

(71) Applicant: Audio Hospitality Inc., Granby (CA)

(72) Inventor: Jean-Yves Lamy, Granby (CA)

(73) Assignee: TECHNOLOGIES NOVHAPTIX INC., Montreal (CA)

( * ) Notice: Subject to any disclaimer, the term of this patent is extended or adjusted under 35 U.S.C. 154(b) by 23 days.

(21) Appl. No.: 17/595,201

(22) PCT Filed: Sep. 9, 2019

(86) PCT No.: PCT/CA2019/051262
§ 371 (c)(1),
(2) Date: Nov. 11, 2021

(87) PCT Pub. No.: WO2020/047679
PCT Pub. Date: Mar. 12, 2020

(65) Prior Publication Data
US 2022/0358818 A1 Nov. 10, 2022

Related U.S. Application Data

(60) Provisional application No. 62/789,574, filed on Jan. 8, 2019, provisional application No. 62/728,603, filed on Sep. 7, 2018.

(51) Int. Cl.
*H04B 3/36* (2006.01)
*G08B 6/00* (2006.01)
(Continued)

(52) U.S. Cl.
CPC .............. *G08B 6/00* (2013.01); *A47C 7/72* (2013.01); *B06B 1/0276* (2013.01); *B06B 1/045* (2013.01); *B60Q 9/00* (2013.01)

(58) Field of Classification Search
CPC .. G08B 6/00; A47C 7/72; A47C 7/727; B06B 1/0276; B06B 1/045; B60Q 9/00; G06F 3/011; B60W 50/16; G10L 21/16
See application file for complete search history.

(56) References Cited

U.S. PATENT DOCUMENTS

| 8,378,964 B2 * | 2/2013 | Ullrich ...................... G06F 3/16 84/645 |
| 2015/0070148 A1 * | 3/2015 | Cruz-Hernandez ..... G06F 3/016 340/407.1 |

(Continued)

*Primary Examiner* — Toan N Pham
(74) *Attorney, Agent, or Firm* — Brouillette Legal Inc.; Robert Brouillette

(57) ABSTRACT

A method of providing a haptic signal is described therein, the method comprising the steps of providing a first source signal, filtering a mid-range band of the first source signal for restricting a bandwidth of the first source signal to the mid-range band, integrating the filtered mid-range band of the first source signal to identify an amplitude of the filtered first source signal, providing a voltage control amplifier with a proportional calibrated voltage on a basis of the integration of the filtered first source signal for adjusting an amplitude of the filtered source signal, isolating a trans-conductance voltage control amplifier high impedance output from a second source signal with a buffer, filtering the filtered source signal with a low pass filter to identify original sub-frequencies of an audio program and combining the identified original sub frequencies of the audio program with transposed midrange frequencies in a haptic signal.

22 Claims, 13 Drawing Sheets

(51) Int. Cl.
*A47C 7/72* (2006.01)
*B06B 1/02* (2006.01)
*B06B 1/04* (2006.01)
*B60Q 9/00* (2006.01)

(56) References Cited

U.S. PATENT DOCUMENTS

2016/0027264 A1* 1/2016 Choi ..................... G08B 6/00
  340/407.1
2017/0316718 A1* 11/2017 Hughes ............... H04M 19/047

* cited by examiner

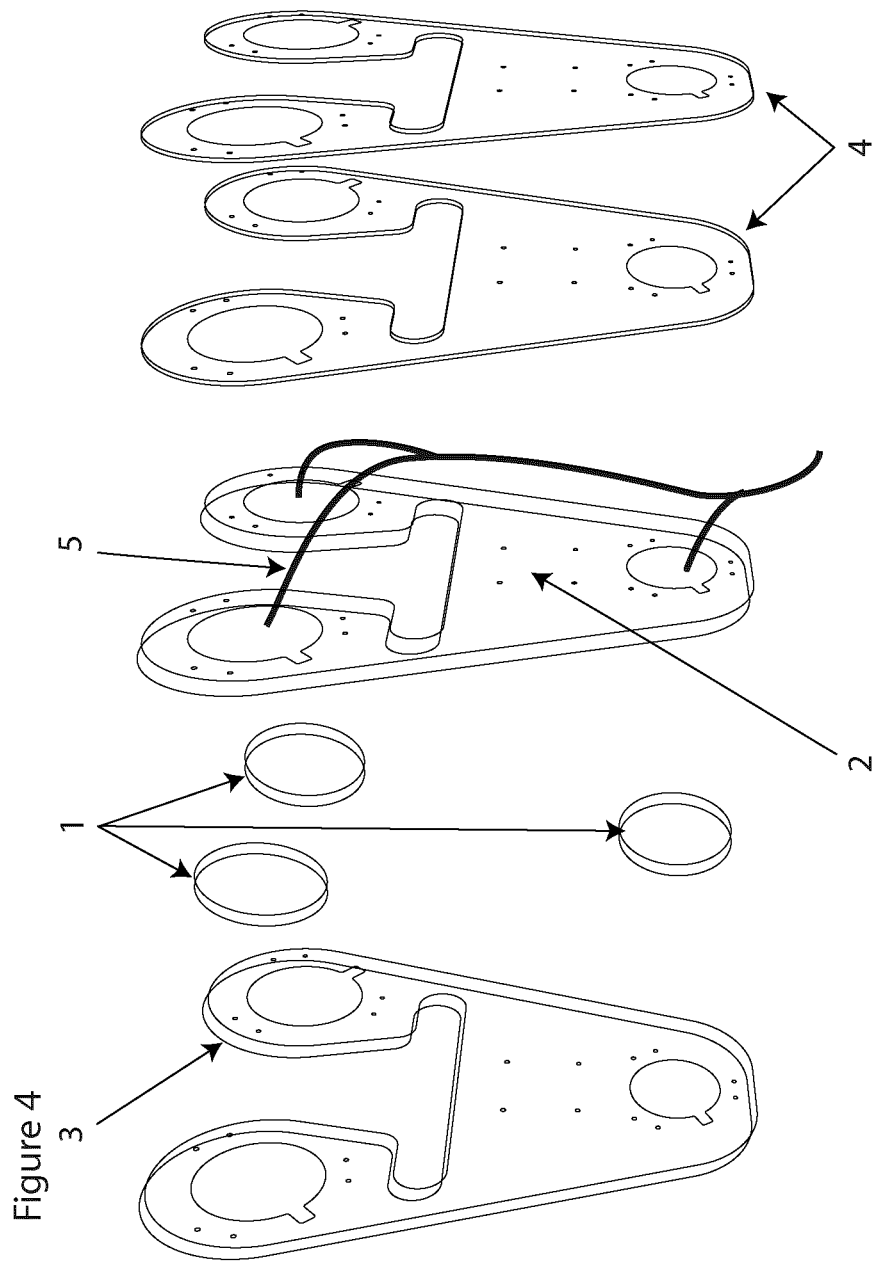

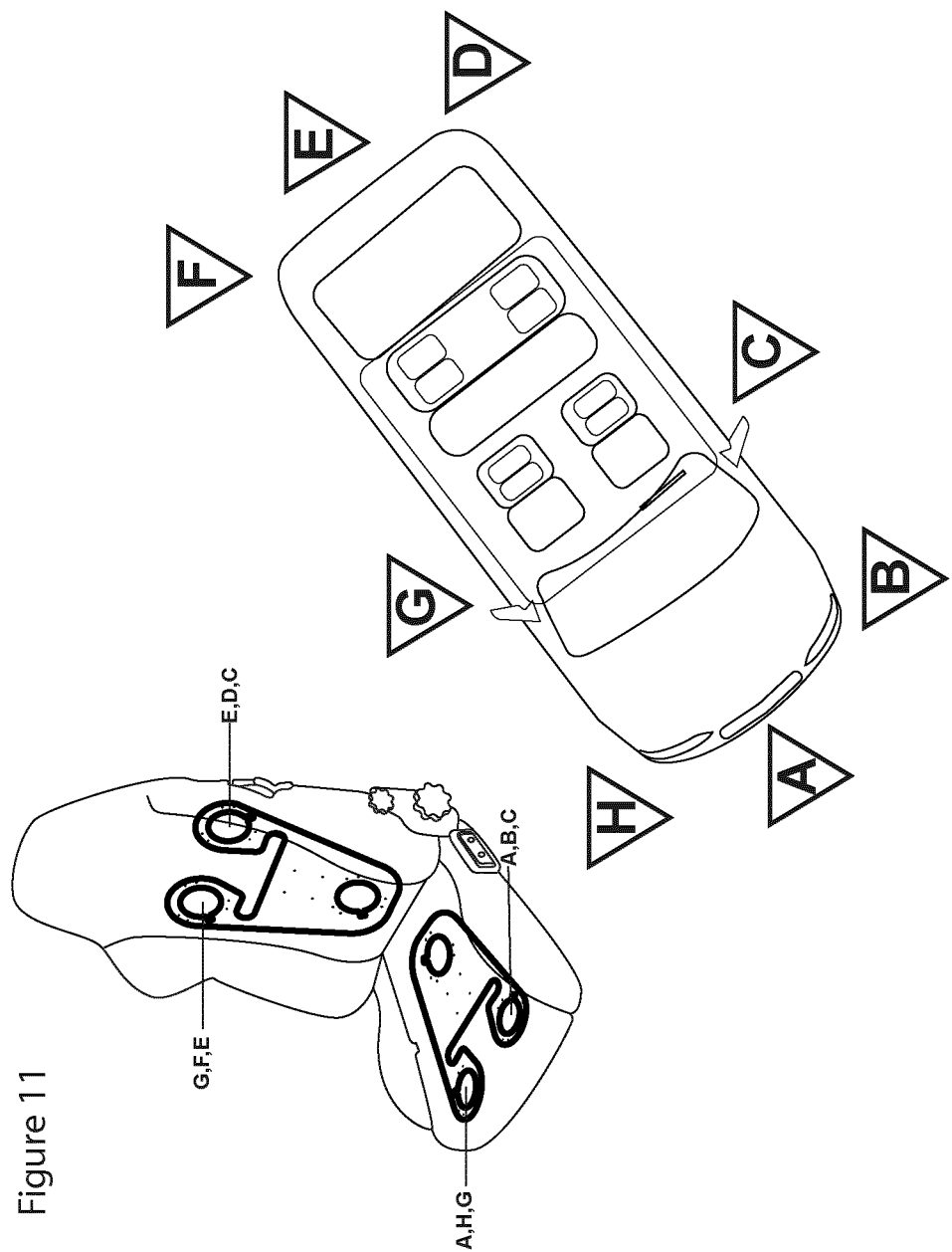

METHODS AND SYSTEMS APPLIED TO TRANSPOSING AUDIO SIGNALS TO HAPTIC STIMULI IN THE BODY FOR MULTICHANNEL IMMERSION

FIELD OF THE INVENTION

The invention leans on multichannel tactile stimuli generated by an electronic signal processing method and by an apparatus that insures efficient haptic energy transfer into the human body.

BACKGROUND OF THE INVENTION

The previous arts in that field are mainly using either electromagnetic motor with an eccentric counterweight that vibrates at a frequency co according to the rpm of the motor mounted on a base plate attached to a seat for instance, linear electromagnetic tactile transducer (LTT) attached to the chair structure or panel for instance or embedded in the clothing fabric or semi-hard shell wearable suit, or a small scale piezoelectric vibrators. also found a contact free haptic transducers using ultrasonic transducers.

These different vibrators, rotating motors or linear tactile transducers are generally driven by a appropriate electric signal amplifier. This amplifier get the haptic signal from a lowpass filter, itself coupled with a variable input stage amplifier that receives the audio source signals. The ultrasonic transducers use a modulation method to induce a physical feeling at a small distance from the human body.

To date all of these methods and devices lack to combining the two prerequisites related to the invention, which are large bandwidth and powerful haptic transmission to the human body AND no artefact sound to be generated as a unwanted by-product when looking for high quality haptic embodiments.

The invention shall provide substantial improvements compared to the previous arts in regard to generating a "Quiet" low noise "HiFi" like realistic haptic feeling.

SUMMARY OF THE INVENTION

The invention improves significantly the use of tactile stimuli to complement the hearing and the sight senses. Immersion is comfortable to the brain when all senses are working together with acceptable synchronicity and definition that bring realistic experiences. The invention provides an improved haptic sensation by transposing sound signals and other low frequency electronic signals in the tactile domain. Although the invention could be used for wearable clothing and backpacks, the focus of the invention is for seating or bedding embodiments.

Although there is many configurations possibilities depending of the desired results and the different embodiments requested, here is a general description of the functional schematic. As per depicted in FIG. 1(A), the invention is composed of 1) a analog signal input interface module, 2) a digital signal interface module with a software that detect, filter, analyze, divide, route, digital mixed data 3) a Analog to Digital (ADC) and Digital to Analog (DAC) converter modules, 4) a multichannel digital signal processor (DSP), 5) a multichannel amplifier/booster to drive linear tactile transducers (LTT). 6) a double delta path support for the linear tactile transducers, 7) flash memory, 8) the GUI.

FIG. 1(B) Depending of the specific system embodiments, the additional devices shall be used as a final and complete system integration. The additional devices are a combination of: headset, a Virtual/Augmented Reality device or video monitor (s), a bluetooth/WiFi IoT when wireless is required, a sound system, a computer or a car embedded multimedia head, a safety logic device in a vehicle that use the ADAS, BCN, linked through the CANBUS 2.0 or more recent extended versions, a seat which depending of the embodiments might be an easy chair, a gaming chair, a sofa, a sectional, an office chair, a passenger seat, a driver/pilot seat.

The main parameters that are managed by the system are: The input sensitivity per channel, the signal codec decoder to be use, the signal multiplex routing process, the signal spectral equalization per channel, the low and high pass filter per channel, the gain per channel, the phase per channel, the time delay per channel, the sampling frequency, the communication protocols.

The method and the system embodiments can provide:

1. Large bandwidth tactile multichannel signal capability.
2. Delta path geometric or double delta path multichannel LTT for directional tactile stimuli translated into 3D tactile experience in gaming and other multichannel sound experiences or safety awareness.
3. Multi LTT for better impedance and tactile sensitivity matching with different zones of the individual back and legs in respect with the spectral power of the soundtrack or the tactile awareness signals.
4. Multi tactile emissive panel areas for ergonomic optimization and good spatial tactile cues.
5. Quiet by acoustic impedance decoupling with the structure of the integration mechanism and the seat, the wearable clothing or the backpack.
6. Proper blending in loudness and in phase with headphones (Personal Field listening) or loudspeakers (Near Field Listening or Wide Field Listening).
7. Self-haptic sensitivity adjusted through special booster (amplifier) topology and current feedback loop for maintaining haptic consistency, independently of individual body mass.
8. Easy to be aftermarket installed or OEM installed.

DESCRIPTION OF THE FIGURES

FIG. 4 is an exploded perspective view of a linear tactile transducers in accordance with at least one embodiment thereof;

FIG. 11 is a perspective view of a seat and a vehicle in accordance with at least one embodiment of the invention.

DESCRIPTION

Tactile Immersive Multichannel Capability.

Figure 1A:
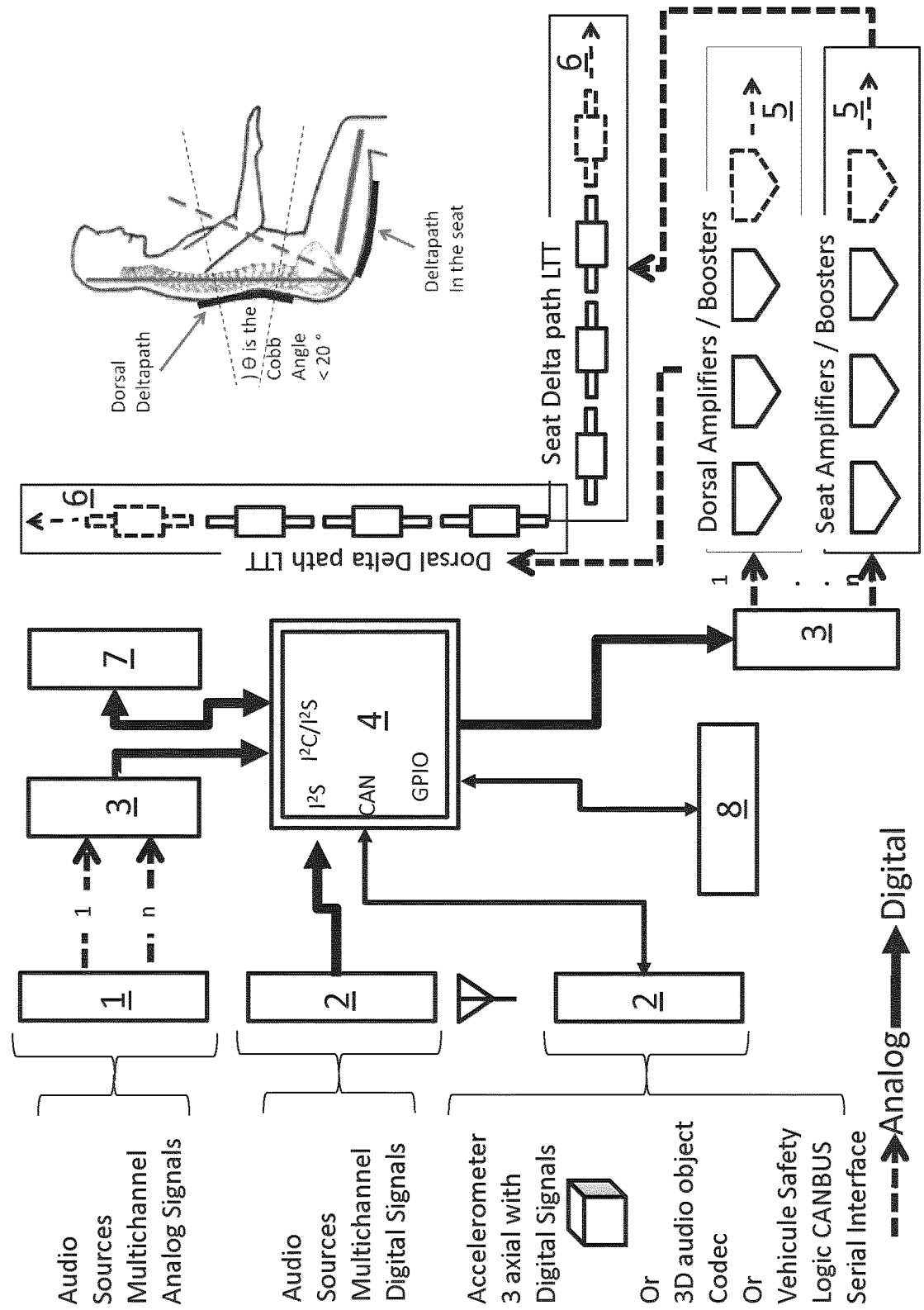
FIG. 1(A) is a block diagram of the system for producing haptic signals.

FIG. 1(A), The signal processing could be provided by a multichannel analog electronic circuit or, by mean of a digital signal processing usually achievable by a MCU board. The tactile vibrations that start around few cycles per second up to about 500 cycles per second are transmitted into the human body by low frequency linear tactile transducers mounted on an emissive panel.

Different configurations of embodiments provide an added tactile sense to the individual wearing the apparatus, seated or leaning in a bed. Different embodiments would be suitable for listening to people, music, relaxing sounds, movies, playing video games, driving vehicles or piloting aircrafts.

The main goal of the invention is to reproducing multichannel tactile stimuli, with enough energy and bandwidth to mimicking natural physical feelings experienced when being on the site of a sound generating phenomena such as live concert, movie theater, thunder, war, big falls, quakes, big music instruments, Etc., without reproducing artefact sounds such as mechanical noise, rattles, structural resonances that are generated in the audio domain, that would interfere with the quality of the immersion or, that would emit noise that are annoying for people around, who are not involved with the immersion experience.

Figure 2:
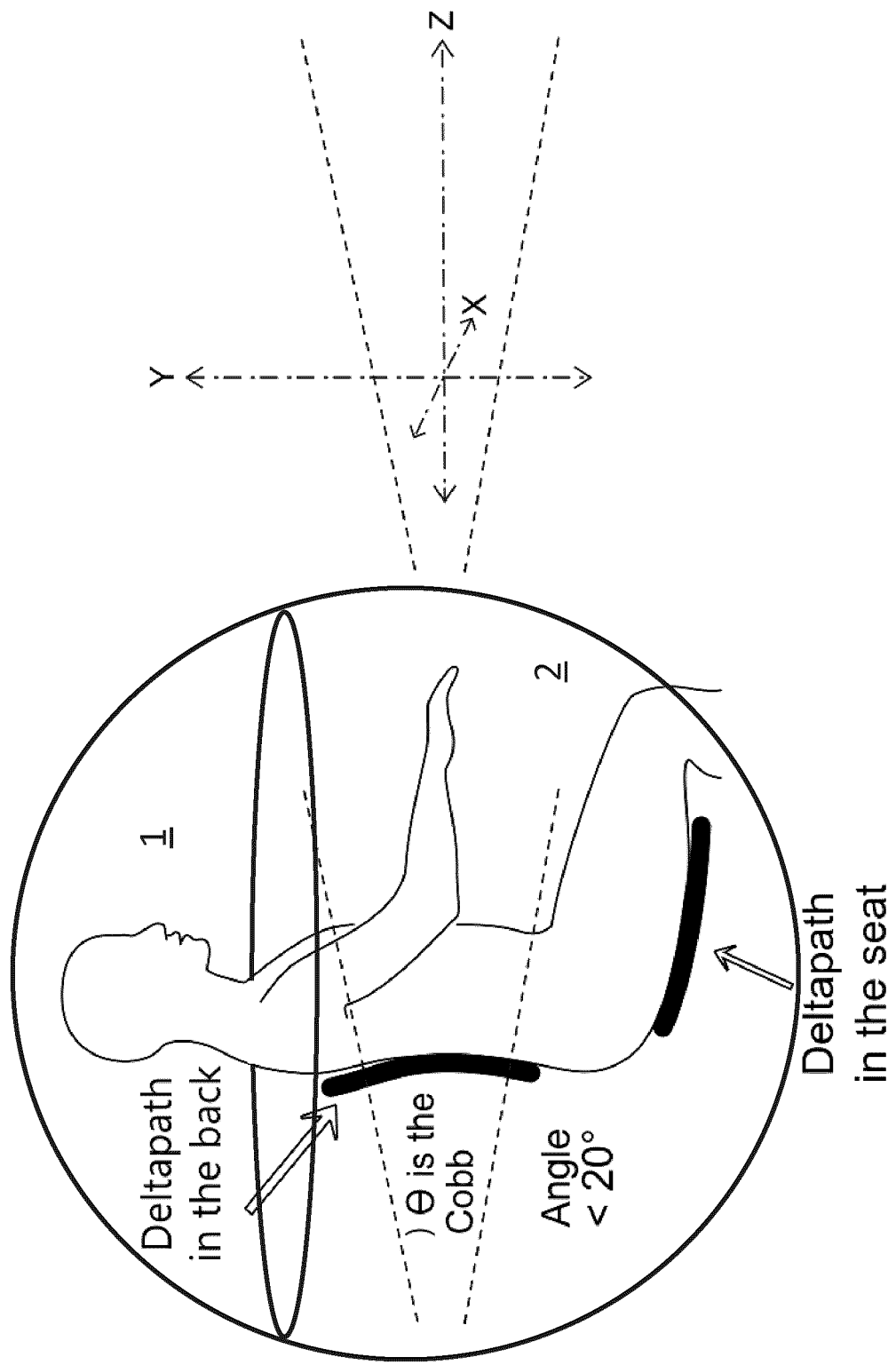
FIG. 2 is a general user reference positioning with the system.

As depicted on the FIG. 2, the seat embodiments are for the individual seated on: a easy chair, a cocoon chair, a sofa, a couch, a sectional, a booth, a gaming chair, a office chair, or a seat cushion or a backpack shall experience a surrounding feeling produced by the overhead multichannel speakers setup or when wearing a headphone/headset and the LTT(s) installed under the seat and or on the back of the seat which add the haptic physical feeling of the soundtrack that typically covers the sub-bass 10 Hz up to the middle midrange zone about 500 Hz. The combination of the perceived sound covering the upper hemispheric (FIG. 2) volume around the head (headphone or multichannel speakers) and the haptic tactile low-mid frequencies coming from the under hemispheric portion of the individual body blend in the brain of the listener as being fully immersed into a spherical sound field.

Delta path or double delta path Multichannel LTTs for directivity of the sound impact for 3D tactile experience in gaming and other multichannel sound experiences or safety awareness.

The invention provides a directional physical stimulus that blend with the soundtrack mix. For the instance the acoustic energy emitted by a sound coming from the right-hand side shall be complemented with a realistic haptic signature comprised in the tactile stimulus spectrum. The tactile energy is provided by mean of at least 3 LTTs per emissive panel. There is one LTT each side of the back applied against the rib cage, just under the scapula. These two upper LTTs provide the haptic signature that cover the tactile energy spectrum between about 80 Hz to about 500 Hz. For tactile stimuli lower than 80 Hz, the physical feeling becomes none directional to the listener body. A third LTT shall be placed in the center meridional lumbar zone of the individual back. This LTT shall address the bottom of the tactile spectrum comprised between about 10 Hz to 100 Hz.

The crossover function for the low-pass and high-pass filter shall be about −12 dB/Octave to ensure a good coherence between the lower and the upper LTT.

Figure 3A:
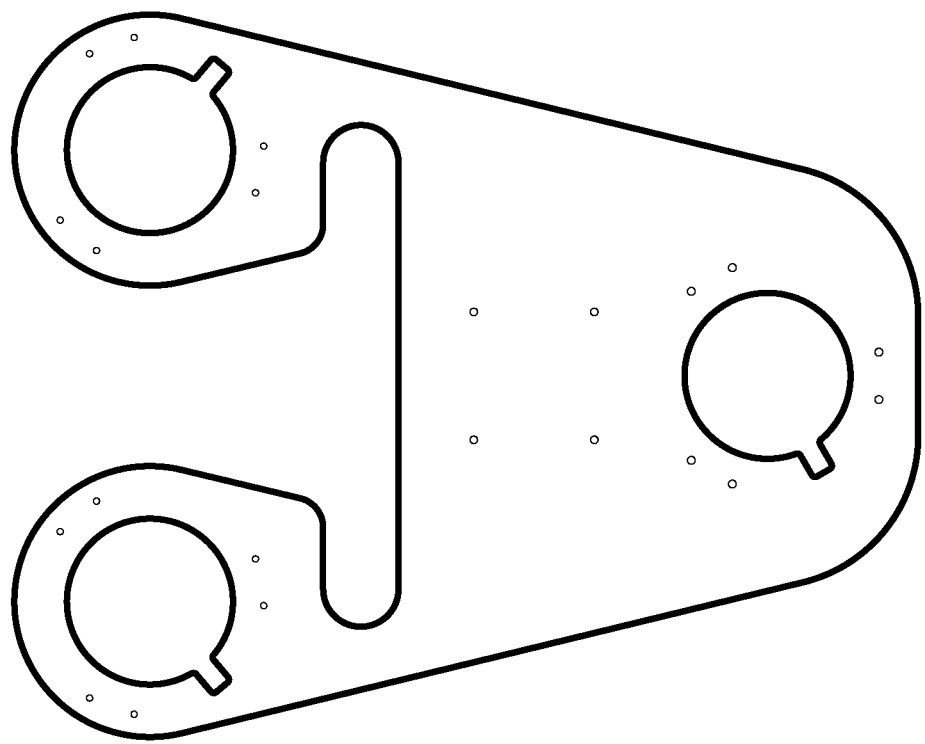
FIG. 3(A) is front elevation view of a linear tactile transducers in accordance with at least one embodiment thereof.

FIG. 3(A) shows the shape of the Delta Path panel. The ratio of the total height 15 inches, by the total width 12 inches, shall be maintained around 1.25. This size might vary +/−15%. Calculated from Euler's formula, the general shape shall provide the smoothest linear vibration pattern possible with its resonance frequency outside the haptic frequency range, while allowing for multi-axis flexibility freedom for comfort. The Delta Path gives good performance with PVC with a thickness of 0.25 inch.

Figure 3B:
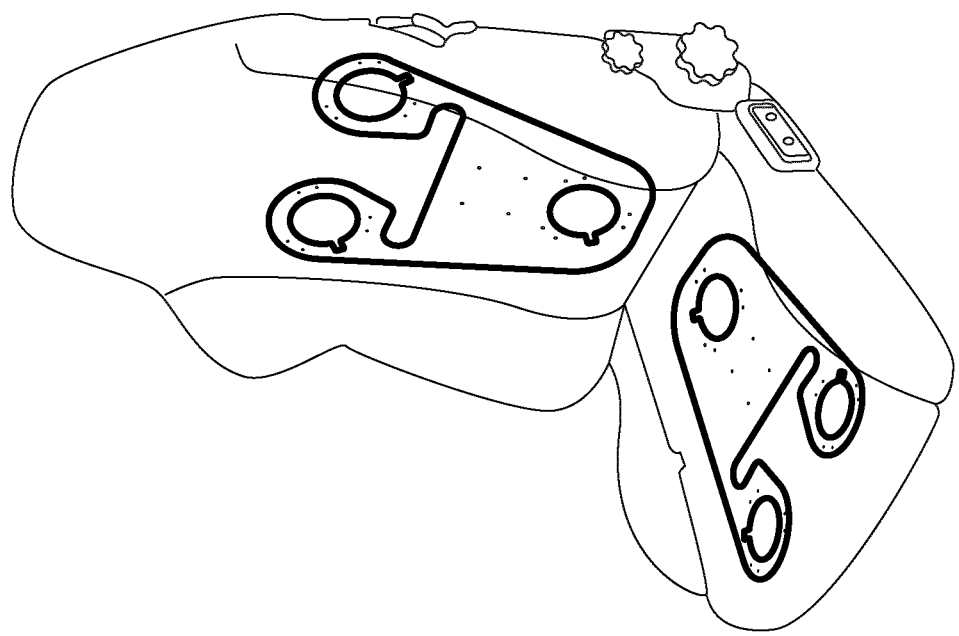
FIG. 3(B) is a perspective view of the linear tactile transducers in a seat in accordance with at least one embodiment thereof.

FIG. 3(B) The Delta Path Multichannel is designed for seated embodiments. This embodiment uses the integrated permanent Delta path apparatus when the LTT system is embedded into the foam/cushion at the chair manufacturer. The Delta Path Multichannel allows aftermarket installation as well. The exact positions in the seat and the back depend greatly of the chair structure and dimensions. But generally speaking, the back upper LTT shall be positioned at the half height of the average adult back size. The front LLT shall be positioned at about 2 inches from the front border of the seat.

As depicted on FIG. 4, the Delta path Multichannel LTT is composed of 1.3 or more tactile transducers (LTT), 2. a composite Y shape panel that maintains the LTTs in place for proper ergonomically and tactical stimuli transmission to the listener body, 3. a neoprene fabric that adds comfort to the listener while providing maximum tactile transfer to the listener body, 4. a multi layer sound absorber coatings that reduce the sound that would leak out of the Delta path Multichannel LTT, 5. the anti-resonance cabling that carries the electrical signal to the LTT units.

Multi LTT for better impedance and tactile sensitivity matching with different zones of the individual back and legs in respect with the spectral power of the soundtrack or the tactile awareness signals.

Figure 5:
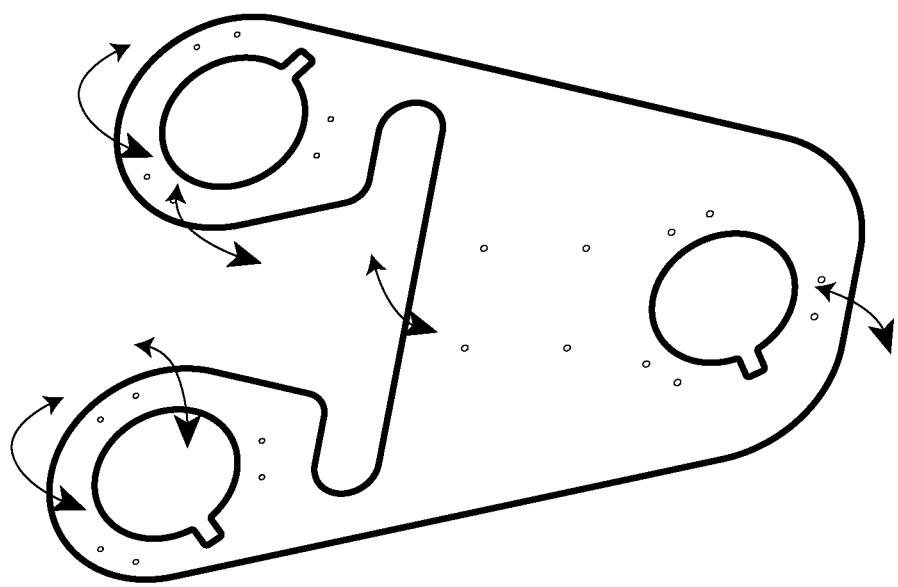
FIG. 5 is front elevation view of a linear tactile transducers in accordance with at least one embodiment thereof.

As depicted on FIG. 5, the Delta path Multichannel LTT is flexible. It shall be designed to follow the listener spinal curvature, not only for the ergonomically and comfort stand points, but for an efficient propagation of the tactile stimuli in the human body.

The tactile stimulus propagation in the human body follows an opening angle of around 20 degrees, according to the average Cobb angle of the human's spine without scoliosis. As depicted on the sketch of FIG. 2, on the Z axis, most of the tactile signal is transmitted to the listener body. However, there is a residual tactile propagation on the Y axis that can be calculated by Ptotal×SIN 20°=about 34%. The invention of the Delta path Multichannel LTT, because of its flexibility, shall provide a propagation in two axes, the Z and the Y axis angle created by the curvature of the back. The complex pattern of tactile energy propagated to the human body shall contribute to providing the listener with an enhanced physical sensation that is close to what would be experienced when exposed in real life environment with equivalent sound loudness and the physical vibration triggered by the sound energy on the physical environment (soil, walls, seats, and the listener). The complex propagation pattern of the vibration in the listener body shall be produced by the combination of a) the distribution of the tactile stimuli dispatched by the 3 or more channels along the X and Y plan issued by the different channels of the soundtrack, b) The open angle of the tactile stimuli propagated in the listener body by the Delta path Multichannel LTT being bended by the pressing weight of the listener's back. Therefore, added to the acoustic reproduction by multichannel speakers or by headphone, the listener shall get immersed in a realistic 3-dimensional audio and haptic stimulation.

Multi Tactile Emissive Areas for Ergonomic Optimization

As depicted on FIG. 3(B), the Delta path Multichannel LTTs shall be mounted on a multiplanar emissive area secured in place by one or two Delta Path Emissive panels or laminated plastic structure that allows freedom of adaptability and equalized pressure fits against the listener back because of its unique 5 degrees of flex freedom. Appropriate pressure leads to better contact with the listener back and therefore optimizes the sensitivity of the tactile transmission. The flex modulus of the Y shape material shall allow for proper mechanical compliance, which shall be about 60 mm of displacement along the Z axis for every 5 Kg of pressure per emissive pad area. Two main reasons shall guide this feature. An efficient and accurate transmission of the tactile signals shall reduce the power required to activate and feel the LTTs. Second, the Delta path apparatus shall not need any kind of harness or belt to be applied and maintained adequate contact against the listener body.

Figure 6:
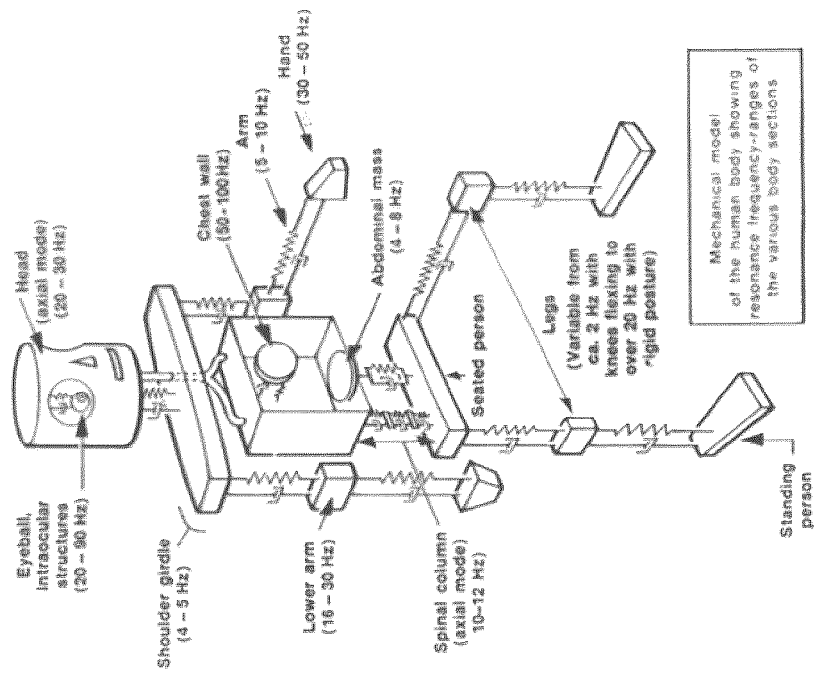
FIG. 6 is a block diagram of various human body resonance frequencies.

We discovered that providing a tactile stimulus in the cervical or behind the head area shall be applied with caution since by nature (FIG. 6.) the human head is barely sensitive to haptic stimuli. Too much tactile stimuli generate resonances in the cranial bone structure that interfere with the sight sense. Search for realistic immersive experience doesn't lead to adding haptic stimuli in this area. That is why there is no LTT located in that area of the human body.

Quiet by Acoustic Impedance Decoupling with the Seat Structure or the Backpack.

The Delta Path apparatus must stay acoustically quiet. To achieve that the invention uses DSP that is covered later in this article. But the Delta Path apparatus needs to be mechanically decoupled from the surrounding frame of the chair for instance.

To achieve that the Delta path apparatus shall decouple the LTT drivers and its emissive pads from the Delta path structure. The decoupling process shall be achieved by a radial suspension that shall link each LTT driver to the Y shape structure. The radial suspension shall allow a low energy transmission of the LTT vibration to the chair structure within the tactile frequency range of about 40 to 500 Hz. Although the Delta Path apparatus frequency response shall cover a frequency response down to about 10 Hz, the 10 Hz to 40 Hz is by nature low in acoustic power, especially when being diffused by a chair. The radial suspension shall absorb a vibration that mainly is generated on the Z axis when the planar pad and the suspension is on the X/Y axes.

The radial suspension shall be design along with using a flexible foam edge or a rubber edge, or a radial geometric slot design that shall maintain the LTT secured in place. Referring to FIG. 3.2, we found that embedding the Delta Path into the foam of the chair provide a good mix of decoupling, good tactile efficiency transmitted to the human body and good comfort which means not feeling the Delta Path and their LTTs. Depending of the foam grade used by the chair, typically, the Delta Path shall be 2 to 3 cm deep into the foam.

Blended Immersive Audio Experience with Headphone or Existing Audio with Multichannel Speaker System The LTT apparatus shall provide to the individual, a linear and low distortion haptic experience that complements the headphone audio reproduction. This shall be realized by allowing the individual to controlling parameters such as the volume adjustment of the LTT, the bandwidth control between 10 Hz to maximum of 500 Hz, the headphone volume control. See the haptic transposer method in this article.

When the LTT apparatus is been used with an audio speaker system, the same parameter controls shall be used in order to properly match the LTT haptic reproduction with an audio system with speakers.

The current method is more that required for producing energetic tactile experience. For instance, a power of about 20 Watts P-P per channel will generate a tactile stimulus up to around 5 G of acceleration, which is enough to exiting the skin, the skeleton structure and the internal organs in the human body.

Figure 7:
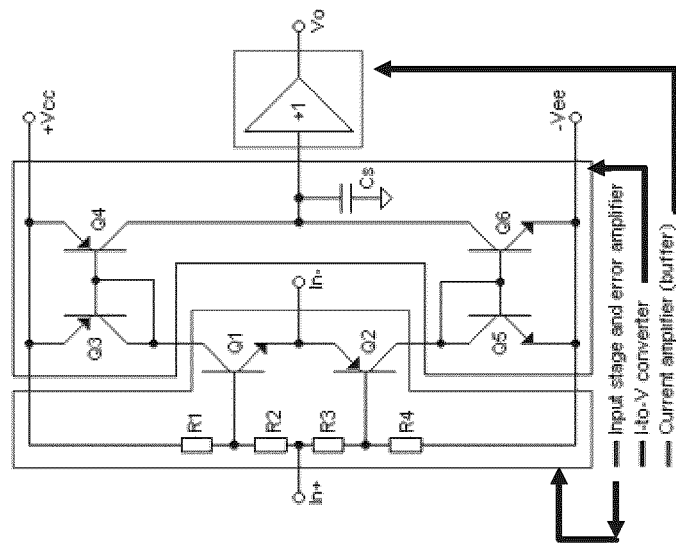
FIG. 7 is an electronic diagram of a portion of the system in accordance with at least one embodiment thereof.

Self-Haptic Sensitivity Adjustment Through Special Booster (Amplifier) Topology and its Current Feedback Loop for Maintaining Haptic Consistency, Independently of Individual Body Mass The Delta Path with their LTTs shall transmit the same amount of tactile energy to different individual body masses. This shall be achieved with a special LTT amplifier output circuit topology depicted in FIG. 7. This method shall be realized by mean of a) a high efficiency electronic driver stage of type D or T, and b) a current feedback loop that modulates the power transmitted to the LTT according to the compliance parameters of the LTT driver loaded by different individual body weights.

Without detailing amplification feedback models and theories, which are out of scoop for this paper, the principle of self-adapting the amount of power to the LTT drivers is as follow: When a LTT is suspended in free space without being loaded and restricted in its Z axis, the LTT's complex compliance curve goes down which can be measure by a significant rise in its electric impedance. The experience demonstrates that more a LTT get loaded with weight that restricts the LTT vibration amplitude, lower the electric impedance is seen from the amplifier point of view. Although this variation in electric impedance is small, but it is enough to be detected by the amplifier current feedback loop. The current feedback loop of the amplifier shall then modulate the amount of power delivered to the LTT drive by reducing the electric energy when the LTT is less loaded by an individual body mass.

This systemic relation between the driving amplifier, the LTT and the human body weight applied is of prime importance for the haptic performance delivered to the listening individual. Therefore, the volume adjustment of the tactile stimuli remains essential, but only for a matter of tactile experience taste and balance with the audio loudness perceived by the listener. This varies with the power of audio systems, along with the loudspeakers or the headphone efficiency.

Transposing Haptic Signal from Audio Programs

The Haptic signal processing module could be achieved following two different electronic domains, the analog domain and the digital domain. The invention could be realized with both electronic domains.

The main differences are:

TABLE A

| Analog Domain | Digital Domain |
|---|---|
| L, C, R, Op Amps parts = less accurate, less stable | Highly accurate |
| Not flexible for adjusting the design | Easily adjustable by changing the software |

TABLE A-continued

| Analog Domain | Digital Domain |
|---|---|
| Expensive to prototype | Cheap to prototype |
| Could require additional DAC if source is Digital | Usually the MCU board comes with ADC/DAC |
| Expensive, not flexible user interface | Comes with GPIO and other touchscreen GUI |
| Difficult to integrating waveform library | MEM space is usually sufficient |

Transposing Haptic Signal from Audio Programs

Figure 8:
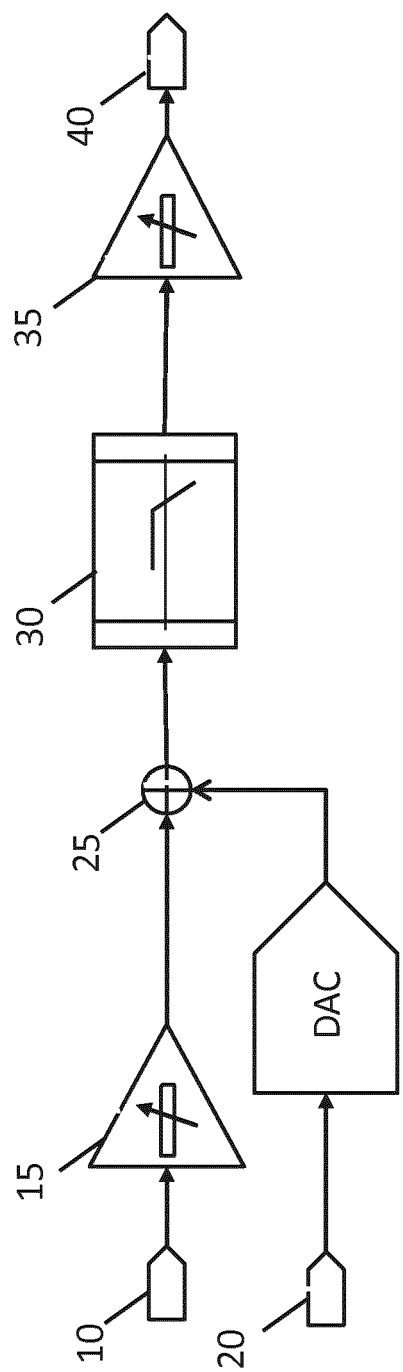
FIG. 8 is an electronic diagram of a portion of the system in accordance with at least one embodiment thereof.

FIG. 8 shows a typical method of extracting the audio signal and passing only a reduced bandwidth which is usually processed by using a low-pass filter of different slope. Two problems occur with this method:
- The haptic signal is usually cut to about 100 Hz to prevent most of the sound leakage produced by the vibrating chair.
- The haptic signal is not completed. The 100 Hz to 500 Hz is missing which gives only the bass part of what should be transmitted into the human body.

Transposing Haptic Signal from Audio Programs (Analog Domain Method)

Figure 9:
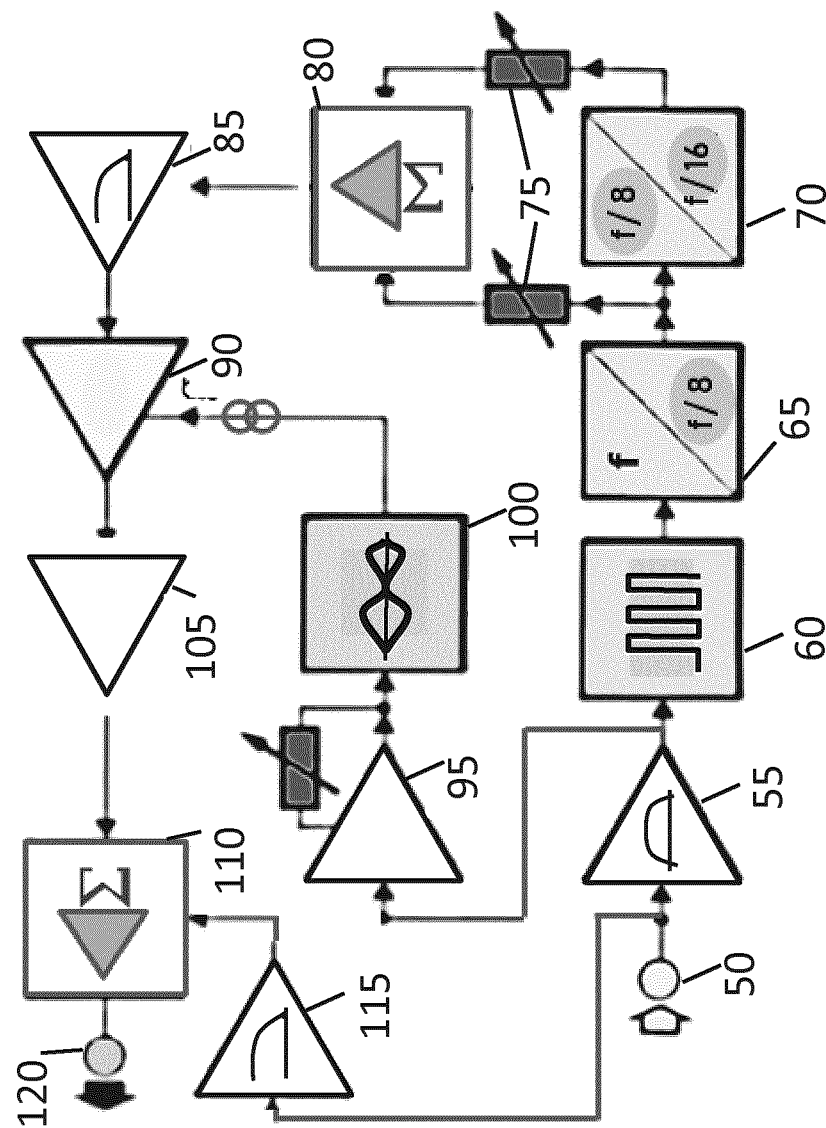
FIG. 9 is an electronic diagram of a portion of the system in accordance with at least one embodiment thereof.

FIG. 9 depicts the signal complex path used to transposing an audio signal to a complete haptic stimulus.

Although the transposing process shall apply to audio multichannel usage, the schematic shows one channel only for simplicity of explanation.

50. Any low-level audio signal shall be connected to this method. If only high-level audio signal is available, a voltage dividing pad shall be added to this circuitry. The input circuitry shall be either single ended or balanced input, by applying proper pre-amplification op amp stage. The low signal shall come from a headphone output, a auxiliary out 55. The usage of band pass filter shall provide the appropriate audio bandwidth to route towards the next stage. The haptic stimulus perceived by the human body is between few Hz up to about 500 Hz. The 100 Hz up to 500 Hz area is critical in order to providing the natural haptic experience. This shall bring the transient, the impact felt in the human body when exposed to a certain amount of sound energy in real life. This stage must be designed to allows selection of different BW along with the type of audio source that the method shall process. The experience demonstrates that optimal BW setting shall be as follow:

TABLE 1

| Haptic Applications | Band-Pass Filter (BW) | Why? |
|---|---|---|
| Gaming | fc: 800 Hz, BW: 600-1000 Hz, −3 dB | Transmitting the physical feeling of the gun shot impacts and other audio cues, Preventing team player voices being transmitted in the haptic domain which will induce distraction. |
| Movies | Fc1: 250 Hz, BW: 177-355 Hz, −3 dB Fc2: 500 Hz, BW: 355-710 Hz, −3 dB | Realistic FX playback Feeling the environment background Good blend with the audio mastering such as Dolby and DTX. |
| Music Live Performance | fc: 250 Hz, BW: 177-355 Hz, −3 dB | Good blend with most of the audiotracks EQ, Prevent haptic stimuli triggered by crowd clapping noise |
| Studio Recorded Music | Fc1: 250 Hz, BW: 177-355 Hz, −3 dB Fc2: 500 Hz, BW: 355-710 Hz, −3 dB | Realistic, natural timbre signature and "weight energy" of music instruments |

The BW selections are a bit different from the general empiric few Hz to about 500 Hz zone. The reason is for covering most of spectrum of the audio trigger events in video gaming, such as gun sounds, explosions, quakes, impacts, Etc. For the music and movie soundtracks, we shall split in 2 different BP filter to cover two octaves, where 90% of the haptic stimuli will be mimicking the original sound weight felt by the human body when located close to the music instruments that generate strong physical feeling in real life, such as double bass, piano, drums, cello, Etc.

The band pass filter shall be between −18 dBs/Octave slope or better with −24 dBs/Octave, with 1:1 gain.

60. This stage is called a Schmitt Trigger function that shall saturate the filtered remaining audio signal. This is a preconditioning stage for insuring the stage 65 won't miss a count. This is a variable clock signal that shall follow the filtered remaining sound wave cycles. The trigger flaps shall be mostly accurate since the filtered one octave audio signal provides pretty simple wave forms that shall be close to sinusoidal shaped for the larger signal amplitude.

65. and 70. Is a basic binary counter that shall divided the variable clock signal. In order to respect the harmonic signature of the original soundtracks, we shall use only the even integer divider.

TABLE 2

| Haptic Applications | Band-Pass Filter (BW) | Why? |
|---|---|---|
| Gaming | fc: 800 Hz, BW: 600-1000 Hz, −3 dB Generating the transposed haptic fundamental ($f_{ch0}$): dividing by 16 $f_{ch0} = fc/16 = 50$ Hz Min-Max: 37.5-62.5 Hz Generating the transposed haptic first harmonic ($f_{ch1}$): dividing by 8 $f_{ch0} = fc/8 = 100$ Hz Min-Max: 65-125 Hz | Transmitting the physical feeling of the gun shot impacts and other audio cues, Preventing team voices being transmitted in the haptic domain which will induce distraction. This n = 2 division stages shall add weight and presence to the game cues. |
| Movies | Fc1: 250 Hz, BW: 177-355 Hz, −3 dB Generating the transposed haptic fundamental ($f_{ch0}$): dividing by 4 $f_{ch0} = fc/4 = 62.50$ Hz Min-Max: 44.25-88.75 Hz Fc2: 500 Hz, BW: 355-710 Hz, −3 dB Generating the transposed haptic fundamental($f_{ch0}$): dividing by 8 $f_{ch0} = fc/8 = 62.50$ Hz Min-Max: 44.25-88.75 Hz | Realistic FX playback Feeling the environment background Good blend with the audio mastering such as Dolby and DTX. Here we use 2 BP filters driving each one n = 1 division stage. We use 2 BP filters; one per octave to insure better counter accuracy. This possible schematic is not shown in this article but relies on the same method. (See in the digital method in this article) |

TABLE 2-continued

| Haptic Applications | Band-Pass Filter (BW) | Why? |
|---|---|---|
| Studio Recorded Music | Fc1: 250 Hz, BW: 177-355 Hz, −3 dB Generating the transposed haptic fundamental ($f_{ch0}$): dividing by 4 $f_{ch0}$ = fc/4 = 62.50 Hz Min-Max: 44.25-88.75 Hz Fc2: 500 Hz, BW: 355-710 Hz, −3 dB Generating the transposed haptic fundamental ($f_{ch0}$): dividing by 8 $f_{ch0}$ = fc/8 = 62.50 Hz Min-Max: 44.25-88.75 Hz | Realistic, natural timbre signatures and "weight energy" of music instruments Here we use 2 BP filters driving each one n = 1 division stage. We use 2 BP filters; one per octave to insure better counter accuracy. This possible schematic is not shown in this article but relies on the same method. (See in the digital method in this article) |
| Music Live Performance with reinforced PA sound system) Or Old Records | Fd: 250 Hz, BW: 177-355 Hz, −3 dB Generating the transposed haptic fundamental ($f_{ch0}$): dividing by 4 $f_{ch0}$ = fc/4 = 62.50 Hz Min-Max: 44.25-88.75 Hz | Good blend with most of the live recorded audiotracks, Prevent haptic stimuli triggered by crowd clapping noise Prevent haptic stimuli triggered by clicks and pops noise on old records |

75. Is a low gain summation function that shall mix the n divider stages. In this example, n=2. Using more even divider stages n>2, won't add significative realism to the generated haptic stimuli, since the additional divided trigger cycles will fall outside the desired 10 Hz up to 100 Hz. The potentiometer shall help in fine tuning the desired haptic EQeffect in regard to the final haptic system response that changes according to the type of chair used (suspension compliance, cushion, frame, Etc.).

80. Is a low gain summation function that shall mix the n divider stages. In this example, n=2. Using more even divider stages n>2, won't add significative realism to the generated haptic stimuli, since the additional divided trigger cycles will fall outside the desired 10 Hz up to 100 Hz.

85. This stage is a low-pass filter that shall smooth out the counter's spikes and glitches. This is an important pre-conditioning stage which shall help to driving the VCO stage properly in the frequency domain. This LP filter shall be set at about 80 to 90 Hz −3 dB, with a good attenuation slope of −18 to 24 dB/octave.

90. The VCO (Voltage Controlled Oscillators) shall generate a near pure sinusoidal wave form that shall be operated at the same frequencies than the driving waves from 85. The VCO is then driven in the domain of frequencies. However, the haptic generated stimuli by the VCO must follow closely the amplitude envelop of the original source of sound. 95. and 100. shall provide the envelop detection to driving the VCO gain expressed in the amplitude/time domain.

95. and 100. The combination of an high impedance op amp plus a RC integrator circuit with germanium diodes shall provide a voltage variation that shall be transform in a current feed that shall drive the VCO in the amplitude/time domain. In order to get a proper behavior of the VCO, the rise and release time of such a circuit shall be about as fast as the haptic transients met in real life. Following our experiences, the ratio of 3×τ, τ being the integrator time constant is a good compromise that shall allow the VCO to reach 95% of the driving frequency amplitude generated signal from stage 85. Also, $\tau = 1/2\pi \times fhmx$, where fhmx is about the 1000 Hz required for the gaming configuration. So 3 $\tau = 1/3 \times 2\pi \times fhmax$ where τ is in the range of 0.16 milli second. If the system is too reactive, then a longer transient constant shall be implemented. The range of the integrator transient time shall be between 0.1 to 1 ms. Therefore 0.5 ms integrator transient response tuning delivers a good compromise in performance.

The potentiometer is useful to calibrating the voltage output that shall drive the VCO gain. Too much gain shall drive the VCO to a saturation state, where unwanted distortion is generated. Not enough gain shall issue a poor, lagging behind, low amplitude VCO haptic signal. A ten turns potentiometer shall allow for proper tuning.

105. is a unity gain op amp buffer that shall provide a low impedance output for the next stage.

110. This stage is an adjustable 0 to 10 dB gain summation function. It shall allow to mix all signals from all branches, but with a balance potentiometer that shall set different ratio between the output dry LF frequencies of stage 115. and the output of the generated transposed haptic signal output from stage 105.

115. Is the complete haptic transposed signal output. This signal shall be routed to the haptic booster amplifier stage, in respect to the number of channel of original audio signal. Our experiences demonstrate that it shall require at least a stereo audio source to provide a directional haptic scenery. The use of an amplifier with a third generated sub channel (called 2.1 configuration) shall be recommended to add fundamental haptic feeling in at the base of the spinal column and the sacrum.

Transposing Haptic Signal from Audio Programs (Digital Domain Method)

Figure 10:
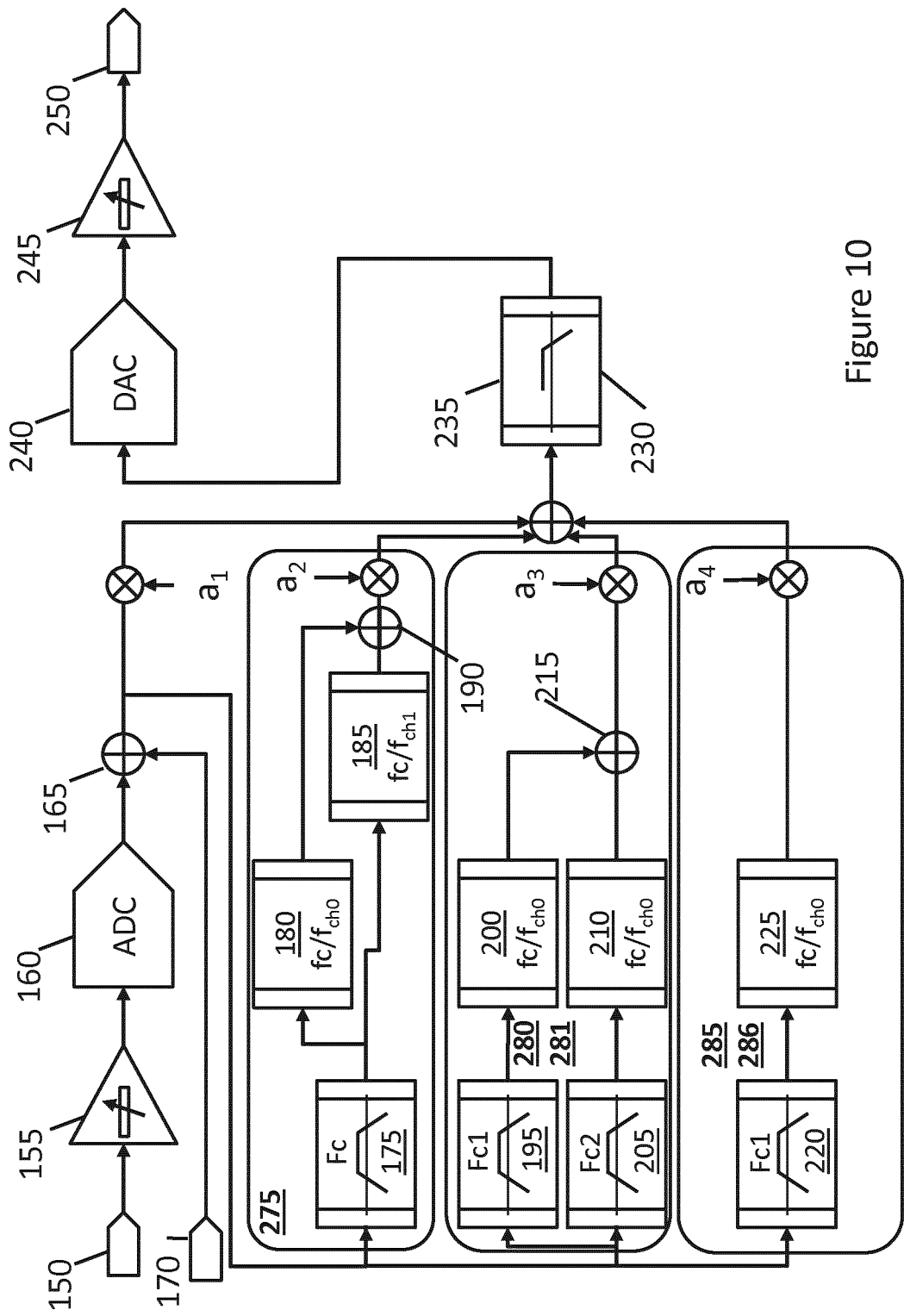
FIG. 10 is an electronic diagram of a portion of the system in accordance with at least one embodiment thereof.

FIG. 10 depicts the signal processing for transposing any audio signals into an realistic haptic signal that will be used to driving a haptic signal amplifier with a power stage, which will drive the haptic transducer. The Fig X shows one channel only. For stereo audio signal, two identical parallel signal processing shall be used.

Some Information about the Haptic Digital Transposer

Figure 1B:
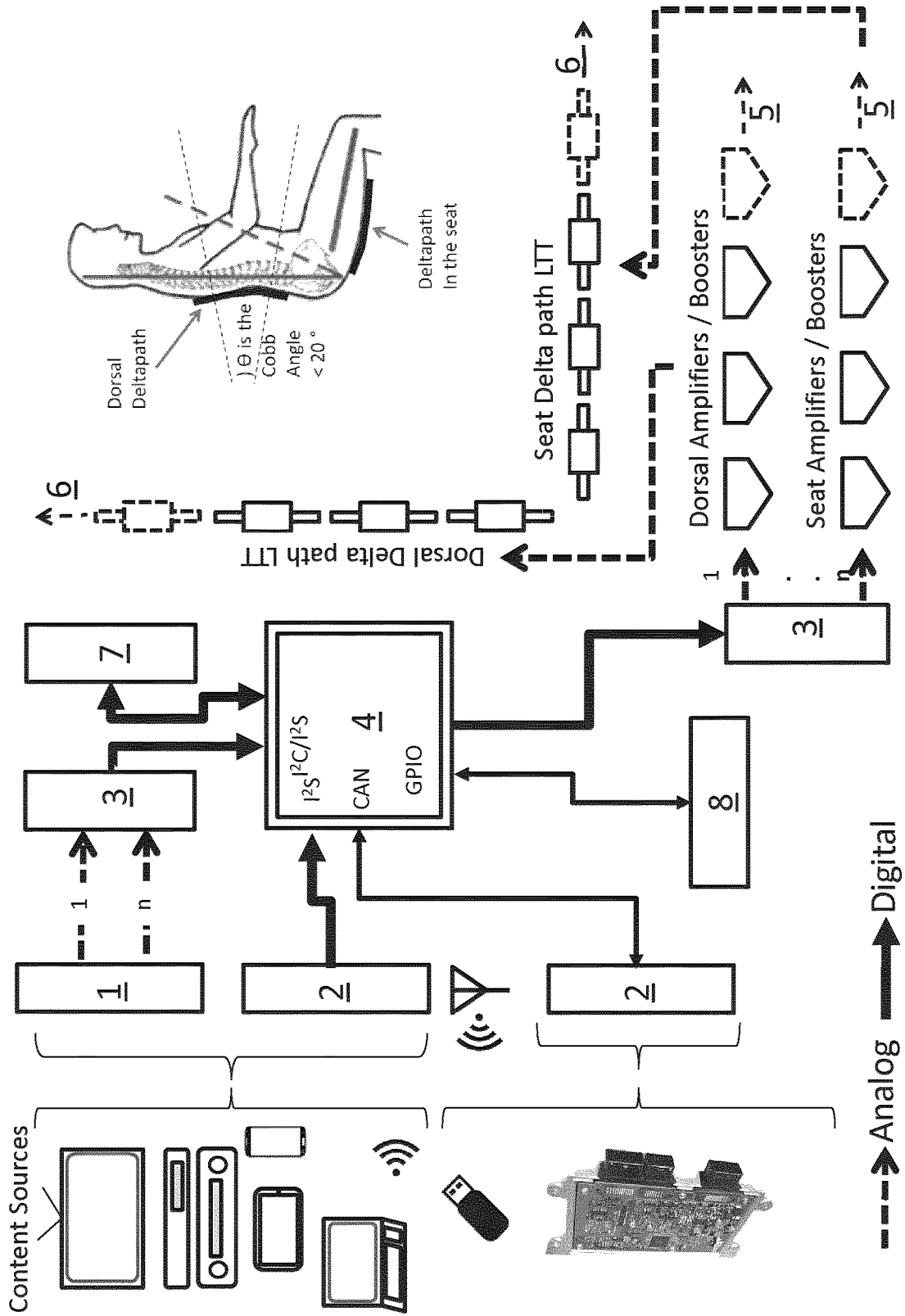
FIG. 1(B) is a block diagram of the system for producing haptic signals.

Many configurations depicted in FIG. 1, shall be built out of the Haptic Digital Transposer method.

a) Most of the haptic chairs or other haptic tactile wearable devices on the market generate the haptic signal from an audio program simply passed through a low-pass filter and then driving a tactile transducer that shakes or rumbles in the low part of the audio spectrum, usually the frequency range of a subwoofer. However, we know that a haptic feeling mimicking with realism what people feels when attending a live concert or a movie at the movie theater, should induce physical vibration in their body up to about 500 Hz. The missing haptic stimuli between 100 Hz up to about 500 Hz from the previous arts in haptic for immersion and augmented audio experiences makes the experience sounds poor, dull, without feeling the dynamic of the impacts (Impulse Transient Response) in your body. This lack of haptic bandwidth makes the experience annoying and distracting after few minutes.

b) Now we know that the haptic system will shake the chair and that will generate artefact noise and rattles. The haptic chair will sing and will rapidly become annoying for people sharing the same space. After many experiments trying to solve this problem we found many solutions that unfortunately are not efficient or practical, such as: adding acoustic insulation to the chair, adding a separated suspension to insulate the tactile transducers, adding weight to vibrating parts, securing firmly the chair with the ground, Etc. Therefore, a) and b) are antagonist and this problem must be efficiently and effectively solved. The method depicted in FIG. 10 shall solve the problem.

The band-pass filter shall be programmable to adjusting the bandwidth, and the center frequency (fc) around the midrange band. These two variables shall be memorized and accessible through available presets selectable with the UI. Typical band-pass selector shall be distributed between the following choices:

c) In order to prevent the full haptic spectrum to generate sound artefacts, we shall transpose the filtered band-pass remaining signal by mean of a frequency divider function. This function is also used with keyboards to play scores in different keys. Here the invention shall transpose the fc (center frequency) of the band-pass filter downward around 50 Hz, which is the middle of the wished haptic spectrum comprised between 10 and 100 Hz. Table 1 provides the transposition rules.

In FIG. 10: 150. The analog audio INPUT shall be connected to an Auxiliary IN signal or a headphone audio OUT stereo signal.

155. A first amplifier stage shall be used in order to adjust the gain of the audio input signal to match the ADC required audio signal amplitude.

160. The ADC (Analog to Digital Converter) shall be used with a minimum of WL=12 bits, at fs=11 kHz to 22 KHz sampling rate. Because the haptic signal is generally recognized to be felt on the human body with a vibration up to about 500 Hz and the extracted audio signal to produce a realistic haptic feeling shall not exceed 1000 Hz, there is no need for using a high performance/high precision ADC and DAC like the one used for converting the whole audio spectrum.

165. Is a simple mixer (summation function, 1:1 gain ratio) that routes the digital audio signal towards 245 and 275 or 280, or 285 along with the selected program sub routine.

170. If the audio signal is available in digital format, like streaming, parallel or serial data packages, this audio digital source might be used through an i2S, SPDIF, or any digital audio signals that are supported by current digital audio interface.

a1. Is a digital gain function where the variable shall be comprised in a range of about 0 to +10 dB which means (165 output×a1) where a1=1 up to 10, by increment of 1 unit. This branch is the original audio source signal that shall be used later and mixed with the other haptic signal branches.

275. Is a selectable sub routine called "Gaming" that shall be selected by mean of the touch screen GUI. Sub routine 275 is unique since it shall use only one band-pass filter, but shall use two frequency divider 180. and 185. The goal shall be to get accurate discrimination of the gaming FX and cues in that specific haptic frequency zone between 600 Hz to 1000 Hz.

175. This band-pass filter shall allow a) to adding a sense of realism and richness when using haptic as a immersive added sense of touch to the gaming when audio volume is about at 95 dB and up, b) to make the haptic signal silent. 175. is a band-pass filter with, usually, an 18 dB/octave slope filter or sharper, which shall be realized by using a BiQuad filter set at fc=800 Hz with a BW starting at 600 Hz −3 dB up to 1000 Hz at −3 dB. BiQuad functions are available in most of the DSP libraries.

180. this function is a typical frequency divider that is available in most DSP libraries. This divider shall have a even integer divider. For fch0, this divider is: 16, which shall position the resulting haptic signal according to the results presented in the Table 2. The divider function shall have a unity gain.

185. this function is a typical frequency divider that is available in most DSP libraries. This divider shall have a even integer divider. For fch1, this divider is: 8, which shall position the resulting haptic signal according to the results presented in the Table 2. The divider function shall have a unity gain.

190. Is a summation function that adds 180 output to 185 output, with a 1:1 gain ratio. a2. Is a digital gain function where the variable shall be comprised in a range of about 0 to +10 dB which means (190 output×a2) where a2=1 up to 10, by increment of 1 unit. This branch is the original audio source signal that shall be used later and mixed with the other haptic signal branches.

280. and 281. Is a selectable sub-routine called: "Movie" for the 280 and called "Studio Recorded Music" for the sub-routine 281. that shall be selected by mean of the touch screen GUI. Sub routines 280 and 281 are different from 275 since it shall use 2 separate band-pass filters of one octave wide each and shall also use two frequency dividers. The goal shall be to get accurate discrimination of the music, voice and FX for movies while covering two octaves allow full capture of the haptic richness.

195. This band pass filter shall allow a) to adding a sense of realism and richness when using haptic as a immersive added sense of touch to the gaming when audio volume is about at 95 dB and up, b) to make the haptic signal silent. 195. is a band-pass filter with, usually, an 18 dB/octave slope filter or sharper, filter set at fc1=250 Hz with a BW starting at 177 Hz −3 dB up to 355 Hz at −3 dB for a full one octave coverage. BiQuad functions are available in most of the DSP libraries.

200. This function is a typical frequency divider that is available in most DSP libraries. This divider shall have a even integer divider. For fch0, this divider is: 4, which shall position the resulting haptic signal according to the results presented in the Table 2. The divider function shall have a unity gain.

205. This band pass filter shall allow a) to adding a sense of realism and richness when using haptic as a immersive added sense of touch to the gaming when audio volume is about at 95 dB and up, b) to make the haptic signal silent. 205. is a band-pass filter with, usually, an 18 dB/octave slope filter or sharper, filter set at fc2=500 Hz with a BW starting at 355 Hz −3 dB up to 710 Hz at −3 dB for a full one superior octave coverage. BiQuad functions are available in the DSP libraries.

210. This function is a typical frequency divider that is available in most DSP libraries. This divider shall have a even integer divider. For fch0, this divider is: 8, which shall position the resulting haptic signal according to the results presented in the Table 2. The divider function shall have a unity gain.

215. Is a summation function that adds 200 output to 210 output, with a 1:1 gain ratio. a3. Is a digital gain function where the variable shall be comprised in a range of about 0 to +10 dB which means (215 output×a3) where a3=1 up to 10, by increment of 1 unit. This branch is the original audio source signal that shall be used later and mixed with the other haptic signal branches.

285. and 286. Is a selectable sub-routine called: "Music Live Performance" for the 285 and called "Old Music Recording" for the sub-routine 286 that shall be selected by mean of the touch screen GUI. Sub routines 285 and 286 are different from the other one since it shall only one band-pass filters of one octave wide and shall also use only one frequency divider. The goal shall be to get accurate discrimination of the music, voice and ambiance for live concerts where there is loud crowd clapping, or old music records with clicks and pops artefact noises. These sub-routines shall be less detailed in regard to the haptic transposition. This is a compromise to live with. However, if an old record got restored, it might happen that it shall perform well on the studio Recording Music setting.

220. This band-pass filter shall allow a) to adding a sense of realism and richness when using haptic as a immersive added sense of touch to the gaming when audio volume is about at 95 dB and up, b) to make the haptic signal silent. 220. is a band-pass filter with, usually, an 18 dB/octave slope filter or sharper, filter set at fc1=250 Hz with a BW starting at 177 Hz −3 dB up to 355 Hz at −3 dB for a full one octave coverage. BiQuad functions are available in the DSP libraries.

225. This function is a typical frequency divider that is available in most DSP libraries. This divider shall have a even integer divider. For fch0, this divider is: 4, which shall position the resulting haptic signal according to the results presented in the Table 2. The divider function shall have a unity gain.

a4. Is a digital gain function where the variable shall be comprised in a range of about 0 to +10 dB which means (240 output×a4) where a4=1 up to 10, by increment of 1 unit. This branch is the original audio source signal that shall be used later and mixed with the other haptic signal branches.

230. The haptic signal shall be the summation of all activated branches. The branch a1 shall be always activated, excepted for special haptic usage such as inducing haptic stimuli for voice intelligibility improvement for instance. Branches a2 to a4 in this specific configuration, shall be activated depending of the listener choice, by mean of selecting the desired sub-routine on the GUI (Table 2). The haptic equalization curve will be provided by setting properly the ax parameters. The summation shall be set to a unity gain. The ax coefficients shall be set preferably at the factory when equalizing a new chair design, for instance, or when calibrating for other usage.

235. In order to reject the digital signal artefacts, a low-pass BiQuad filter set to 80 to 90 Hz at −3 dB with a slope of −18 dB/octave or sharper shall be used. The filter shall be set to a unity gain.

240. A DA converter shall convert back the haptic transposed signal with a sufficient precision. For haptic transposed signals, 10 or 12 bits with a 11 Kfs or 22 Kfs shall be providing a good enough low distortion haptic analog signal.

245. This an op amp with a digital selectable gain from 0 to 10 dBs. The increment shall be by step of 1 dB.

250. This analog haptic signal output shall be routed towards the haptic booster, that shall drive the LLT along with the required apparatus designed.

The processing power required depends greatly of the CPU/GPU chosen. It shall be recommended to using a 32 to 64 bits CPU equipped with a DSP. co-processor. It is also greatly depending of the DSP coding structure. The whole digital or analog processing methods shall be achieved within a 5 ms elapse time. When source signal as to be wireless transmitted, an additional Bluetooth latency of about 30 ms for LLT BT devices is added. That means the total latency of end to end haptic transposition shall be about 35 ms. This is about the maximum latency allowed when listening to a movie or for gamer usage who are detecting very low latencies between the soundtrack and the haptic stimuli synchronism.

Transposing Haptic Signal for Safety Warning (Digital Domain Method)

As an example of multichannel haptic application, the invention might be configured in automotive/transportation sector as a way to inducing vectorized haptic stimuli. the FIG. 11 shows an example among many other combinations of mappings of warning haptic triggered signals that improve the awareness of the driver when there is a safety related even detected by the vehicle safety system in a 360 degrees view.

What is claimed is:

1. A method of providing a haptic signal, the method comprising the steps of:
   providing a first source signal;
   filtering a mid-range band of the first source signal for restricting a bandwidth of the first source signal to the mid-range band;
   integrating the filtered mid-range band of the first source signal to identify an amplitude of the filtered first source signal;
   providing a voltage control amplifier with a proportional calibrated voltage on a basis of the integration of the filtered first source signal for adjusting an amplitude of the filtered source signal;
   isolating a trans-conductance voltage control amplifier high impedance output from a second source signal with a buffer;
   filtering the filtered source signal with a low pass filter to identify original sub-frequencies of an audio program; and
   combining the identified original sub frequencies of the audio program with transposed midrange frequencies in a haptic signal.

2. The method of claim 1, further comprising, after integrating the filtered mid-range band of the first source signal,
   dividing the mid-range band of the filtered mid-range first source signal in a plurality of sub-harmonic fractions;
   combining the plurality of sub-harmonic fractions to produce a sinusoidal fundamental signal and at least one sinusoidal harmonic signal associated with the sinusoidal fundamental signal; and
   cleaning residual harmonics that are higher than the combined sinusoidal fundamental signal and the at least one sinusoidal harmonic signal from the combined sub-harmonics to produce a cleaned signal.

3. The method of claim 2, wherein the first source signal is one of a digital signal and an analog signal.

4. The method of claim 3, further comprising converting the analog signal to a digital signal when the first source signal is analog.

5. The method of claim 4, wherein converting the analog signal to the digital signal is made with a Schmitt trigger.

6. The method of claim 2, wherein a multistage digital logic is dividing the filtered mid-range band of first source signal.

7. The method of claim 2, wherein filtering mid-range band of the first source signal is filtering frequencies of about between 400 Hz and 750 Hz band pass filtering.

8. The method of claim 2, wherein the plurality of sub-harmonic fractions is two-sub-harmonic fractions.

9. The method of claim 8, wherein the first source signal is divided with a first sub-harmonic fraction that is about twice a second sub-harmonic fraction.

10. The method of claim 9, wherein the first sub-harmonic fraction is ⅛ of the first source signal and the second sub-harmonic fraction is 1/16 of the first source signal.

11. The method of claim 2, wherein filtering the filtered first source signal with a low pass filter is keeping frequencies of about between 10 Hz and 120 Hz.

12. The method of claim 2, wherein, after the cleaning of residual harmonics, reshaping the first source signal with the voltage control amplifier.

13. The method of claim 12, wherein reshaping the first source signal is adjusting the frequency and modulating the amplitude of the cleaned signal.

14. The method of claim 2, wherein filtering the filtered source signal with a low pass filter to provide the original sub frequencies of the audio program is made with frequencies of about between 20 Hz and 80 Hz.

15. The method of claim 2, wherein the haptic signal is adapted to be transmitted to a living body is a human.

16. The method of claim 15, wherein the haptic signal is applied to a back portion of the human with a back-contacting haptic stimuli device.

17. The method of claim 16, wherein the back-contacting haptic stimuli device includes a linear tactile transducer.

18. The method of claim 17, wherein the linear tactile transducer is adapted to transmit the haptic signal against a rib cage.

19. The method of claim 18, wherein the linear tactile transducer is adapted to provide a tactile spectrum comprised between about 20 Hz and about 120 Hz.

20. The method of claim 19, wherein the linear tactile transducer is adapted to provide a three-dimensional tactile stimulus.

21. The method of claim 1, wherein the method is contained as computer-readable instructions on a non-transitory computer-readable medium that, when the instructions are executed by a processor of a computer system, cause the computer system to perform operations for providing the haptic signal.

22. A computer system adapted to provide a haptic signal, the computer system comprising
   a CPU; and
   a memory,
   the CPU being adapted to execute the method of claim 1.

* * * * *